Nov. 22, 1932.  J. HERMAN  1,888,266

MEASUREMENT OF CROSS TALK

Original Filed Aug. 28, 1930

INVENTOR
J. Herman
BY
ATTORNEY

Patented Nov. 22, 1932

1,888,266

UNITED STATES PATENT OFFICE

JOSEPH HERMAN, OF WESTFIELD, NEW JERSEY, ASSIGNOR TO AMERICAN TELEPHONE AND TELEGRAPH COMPANY, A CORPORATION OF NEW YORK

MEASUREMENT OF CROSS-TALK

Application filed August 28, 1930, Serial No. 478,509. Renewed April 11, 1932.

This invention relates to transmission measurement in connection with circuits carrying alternating currents, and more particularly to methods of and means for measuring the "cross-talk" between two transmission lines.

It is old in the art to measure the "transmission equivalent" of a telephone circuit, and the methods which have been employed for such measurement are in some respects similar to those forming a part of the present invention. In the measurement of interference such as cross-talk between two transmission lines, however, certain peculiar problems are presented, and the general object of this invention is the satisfactory solution of these problems, as will appear hereinbelow.

In the measurement of cross-talk, the large loss in the cross-talk "paths" between the circuits usually reduces the received measuring current to a level which approximates that of the noise currents in the frequency range involved in the measurement. In accordance with one of the principal novel features of the present invention, special provision is made for the elimination or substantial reduction of the effects of the noise.

The attainment of this end of reduction of noise effect requires the production of special testing or measuring currents, and the second specific object of this invention is the production of such currents.

Other features and advantages of the invention will appear from the reading of the following description and explanation of the applicant's novel methods and means.

The applicant accomplishes his general purpose of satisfactory measurement of cross-talk by generating at each end of the transmission lines two alternating currents which vary in frequency continuously and simultaneously but have a constant difference in frequency, applying the currents generated at the sending end of the interfering line for transmission thereover, deriving from the portion of the two currents received at the receiving end over the line interfered with a current of the difference frequency, deriving at the receiving end from the two currents generated at that end a second current of the difference frequency, and, after segregating them from other currents, comparing in magnitude these two currents of the difference frequency. The comparison furnishes a measure of the cross-talk between the two transmission lines.

Figure 1:
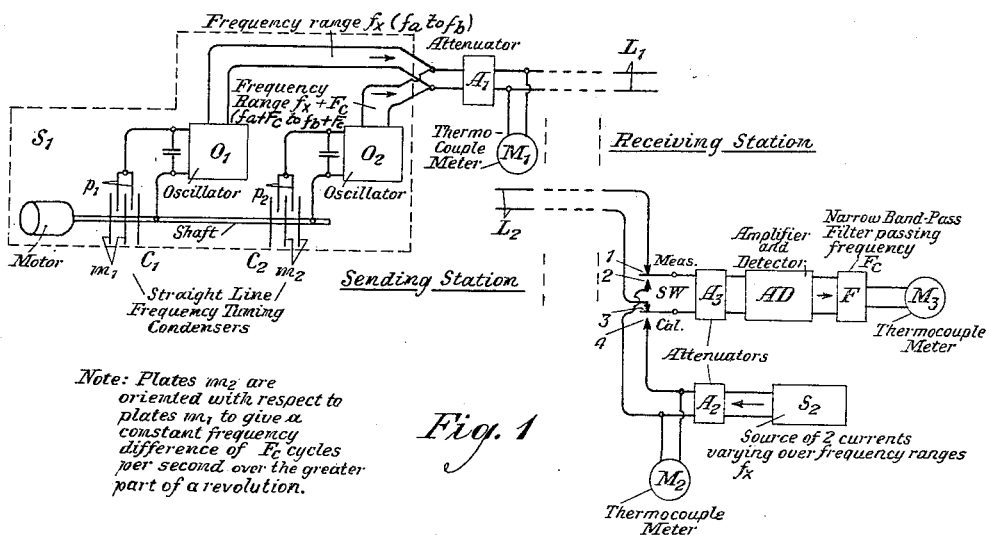
Figure 2:
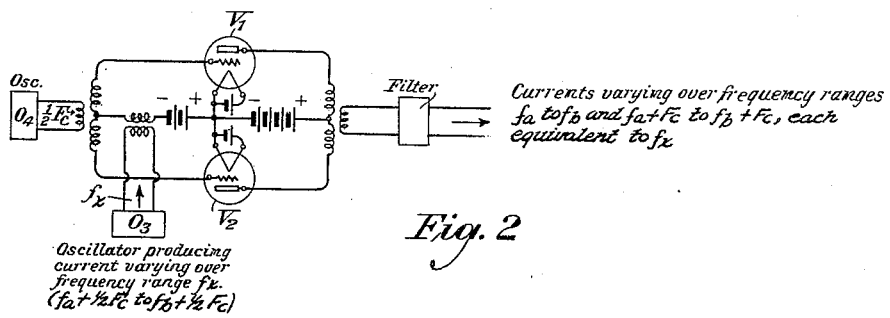
Figure 3:
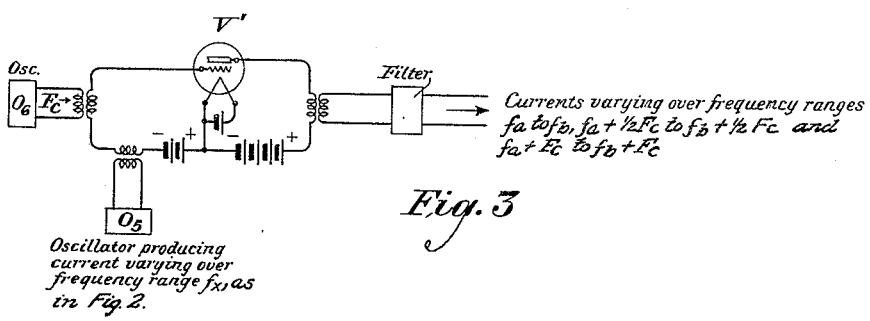

The invention will be more clearly understood from the following description, reference being had to the accompanying drawing, in which Figure 1 shows diagrammatically, and in part schematically, one desirable arrangement of apparatus for practicing the invention, including one desirable arrangement for producing the special measuring currents;

Fig. 2 shows a second desirable arrangement for producing the measuring currents, it being understood that this device may be substituted for the corresponding devices of Fig. 1 and will function similarly in combination with the other elements of that figure; and Fig. 3 shows a third arrangement for producing the measuring currents, this arrangement being capable of substitution in the circuits of Fig. 1 and having possible advantages for certain purposes over the devices of Figs. 1 and 2, although, in general, it will be found less desirable than either of the other current producing arrangements.

With reference to the details of the drawing and first with particular reference to Fig. 1, there are shown two transmission lines $L_1$ and $L_2$ indicated as extending from a station at the left designated "sending station" to a station at the right designated "receiving station". At the sending station, there is disclosed a source $S_1$ which produces two continuously variable frequency currents. This device $S_1$ will be described in detail hereinbelow. For the present, it is sufficient to state that the output of $S_1$ comprises first and second currents continuously varying in frequency over a range of $f_x$ cycles which is covered several times a second. The frequency of the first current varies from a lower value $f_a$ cycles to a higher value $f_b$ cycles. The frequency of the second current varies in such a way as to maintain a constant difference $F_c$ from that of the first current. The frequency of the second current thus varies from a lower value $f_a+F_c$ to a higher value $f_b+F_c$ but the range of variations is $f_x$ cycles which is the same as that of the first current.

These two alternating currents, which are preferably of equal magnitudes, are applied to the line $L_1$, which is assumed to be the interfering line, and may be adjusted to a predetermined value by means of the attenuator $A_1$ and the thermocouple meter $M_1$. As is well understood in the art, a certain amount of these measuring currents will flow across the cross-talk "paths" from the interfering line $L_1$ to the line $L_2$ interfered with and will, accordingly, reach the receiving station over the latter line. At the receiving station in association with the line $L_2$ are an attenuator $A_3$, an amplifier and detector device AD, a filter F and a thermocouple meter $M_3$. There is also provided a two-way switch SW, which in its upper or measuring position closes contacts 1 and 3 and which may be thrown to its lower or calibrating position to close contacts 2 and 4, as indicated in Fig. 1.

When the two measuring currents described above reach the receiving station over line $L_2$ with the switch SW in its measuring position, they pass through attenuator $A_3$ and into the amplifier and detector AD, in which latter device modulation takes place, producing, among several currents, a current of the difference frequency $F_c$, which is the difference frequency of the two currents generated in $S_1$ at the sending station. The magnitude of this resultant current is equal to the product of the magnitudes of the two currents varying in frequency over ranges $f_x$. The filter F is a very narrow band-pass device designed to pass the frequency $F_c$. The output of this filter F produces a reading on the thermocouple meter $M_3$, which might, of course, be replaced by a rectifier and direct current meter designed to integrate over a period of time or by any other suitable device known in the art. The reading on the meter $M_3$ may be adjusted to a suitable value by means of the attenuator $A_3$.

The switch SW is now thrown to its calibrating position, opening contacts 1 and 3 and closing contacts 2 and 4. The source $S_2$ at the receiving station corresponds to the source $S_1$ at the sending station and produces two alternating currents like those produced by $S_1$, varying continuously in frequency over ranges $f_x$ that is, $f_a$ to $f_b$ and $f_a+F_c$ to $f_b+F_c$, respectively. The output of $S_2$ may be adjusted in magnitude by means of the attenuator $A_2$ and thermocouple meter $M_2$. With the switch SW in its calibrating position, there will be produced, of course, modulation in the amplifier and detector device AD and a second reading on the thermocouple meter $M_3$. By means of the attenuator $A_3$, the reading produced on meter $M_3$ by the currents from $S_2$ (after modulation) is adjusted to equal the reading previously obtained from the selected modulation product of the currents produced at the sending station. It will now readily be understood that the adjustment of the setting of attenuator $A_3$ will serve as a measure of the cross-talk between lines $L_1$ and $L_2$ over the limited frequency range $f_a$ to $f_b$.

The use for measuring purposes of the two alternating currents varying continuously in frequency but differing in frequency by a constant number of cycles per second permits the use of a fixed filter such as F with a very narrow band width, and this arrangement minimizes the effect of noise currents in the transmission lines. If a single current of variable frequency were used for the measurement, it would be necessary to widen the band width of the filter F to include the range from $f_a$ to $f_b$, and consequently there would be interference with the measurement by noise currents. It would be possible to change the band pass frequency of a narrow band pass filter such as F in synchronism with the variation in frequency of the measuring currents, but it will be clear to those skilled in the art that it is not feasible to provide such an arrangement which is satisfactory.

The specific form of device for producing the measuring currents shown in Fig. 1 as $S_1$ will now be described. There are employed two oscillators $O_1$ and $O_2$. The tuning capacity of these oscillators is made up in part, at least, of the tuning condensers $C_1$ and $C_2$ which may be of the straight line frequency type. These condensers have fixed plates $p_1$ and $p_2$, respectively, and movable plates $m_1$ and $m_2$, respectively. The movable plates of both condensers are mounted on a common shaft which is driven by a motor as indicated in the drawing. These movable plates, as indicated above, may be designed to give a straight line frequency characteristic. The plates $m_2$ of condenser $C_2$ might be oriented slightly with respect to the plates $m_1$ of condenser $C_1$ to give, over the greater part of their range, a constant frequency difference designated as $F_c$ between the frequencies of the alternating currents produced by the oscillators $O_1$ and $O_2$ while the frequency of the first current varies with the range $f_x$ and the second current varies simultaneously. An approximately constant difference in frequency over a limited frequency range might also be obtained by making the fixed tuning capacities of $O_1$ and $O_2$ slightly different or by making the plates of the variable condensers $C_1$ and $C_2$ different in size. There are thus produced by $S_1$ and applied to the transmission line $L_1$ the two alternating currents varying continuously over ranges $f_x$ that is, $f_a$ to $f_b$ and $f_a+F_c$ to $f_b+F_c$, respectively.

In Fig. 2 of the drawing there is shown an arrangement for producing the measuring currents which may be substituted in the arrangement of Fig. 1, for instance, for the source $S_1$ in the one case and the source $S_2$ in the second. This alternating current generating device includes a balanced modulator arrangement with three-electrode vacuum tubes $V_1$ and $V_2$ connected in the well known manner. The oscillator $O_3$ is designed to supply to the input circuit of the modulator an alternating current continuously varying in frequency over the range $f_a+\frac{1}{2}F_c$ to $f_b+\frac{1}{2}F_c$ for instance. The oscillator $O_4$ furnishes a current of fixed frequency $\frac{1}{2}F_c$. When the outputs of these two oscillators are impressed on the input of the modulator, the frequency of the oscillator $O_3$ is balanced out in the output circuit of the modulator, as is well understood in the art. A filter in the output of this arrangement of Fig. 2 is designed with a band width of $f_a$ to $f_b+F_c$ cycles, for instance, and the side bands, which cover ranges of $f_a$ to $f_b$ and $f_a+F_c$ to $f_b+F_c$, are separated from the other modulation products. It will be obvious to those skilled in the art that these two frequency ranges are equivalent to the ranges designated as $f_x$ in Fig. 1; in other words, the side bands indicated are the same as the two waves of Fig. 1.

The arrangement of Fig. 3 of the drawing is another which may be used in place of the sources $S_1$ and $S_2$ of Fig. 1. This arrangement includes a simple modulator device with three-electrode vacuum tube $V'$. The oscillator $O_5$ produces a current varying over a frequency range $f_x(f_a+\frac{1}{2}F_c$ to $f_b+\frac{1}{2}F_c)$, while the oscillator $O_6$ produces a current of fixed frequency $\frac{1}{2}F_c$. In the output of the arrangement, the filter may have a band pass range to pass the carrier and the two side bands. Thus, we may have in the output of the arrangement three alternating currents varying over the frequency ranges $f_a$ to $f_b$, $f_a+\frac{1}{2}F_c$ to $f_b+\frac{1}{2}F_c$ and $f_a+F_c$ to $f_b+F_c$, respectively, and it will be understood that these variations are simultaneous. If these currents are passed through a detector at the receiving station, there may be obtained either from the first and second continuously varying currents, or from the second and third continuously varying currents, a current of the constant frequency $F_c$. While the arrangement of Fig. 3 might thus have advantages for certain purposes, it will always have the disadvantage, with relation to the arrangements of Fig. 1 and Fig. 2, that the magnitude of the carrier current with respect to the side band currents must be the same in the modulators at the two stations; otherwise, the results obtained would not be accurate.

It will be understood by those skilled in the art that the applicant's methods and circuit arrangement are applicable not only to the measurement of the "bar-end" cross-talk, specifically disclosed, but also to the measurement of "near-end" cross-talk. In the measurement of the "near-end" cross-talk at the sending station of Fig. 1, for instance, it will be understood that a first current of the difference frequency is derived from the energy coming in over line $L_2$ (by reason of the "near-end cross-talk" effect) and that a second current of the difference frequency may be produced by impressing the currents from the local sources $S_1$ on the detecting means (such as AD). Thus, in the case of the measurement of the "near-end" cross-talk at the left-hand station of Fig. 1, the detecting and measuring apparatus is employed at that left-hand station, and the second source $S_2$ is not required.

While a somewhat specific disclosure of the embodiment of the applicant's invention has been made above, it is to be understood that the true scope of the invention is determined by the appended claims.

What is claimed is:

1. The method of measuring the interference between two transmision lines which consists in producing at each of two distant stations a first alternating current of continuously varying frequency and a second alternating current varying in frequency simultaneously with the first current but having a constant frequency difference therefrom, applying the currents produced at the first station to the interfering line, deriving from that portion of the two currents received at the second station over the line interfered with a current of the difference frequency, and determining the attenuation of the interfering path from the magnitude of this current segregated from other currents.

2. The method of measuring the cross-talk between two transmission lines which consists in producing at each end thereof a first alternating current of frequency varying continuously over a limited range and a second alternating current varying in frequency simultaneously with the first but having a constant frequency difference therefrom, applying the currents produced at the sending end to the interfering line, deriving from that portion of the two currents received at the receiving station over the line interfered with a first current of the difference frequency, segregating said current from other currents and measuring its magnitude, deriving at the receiving station from the two currents locally produced a second current of the difference frequency, adjusting the magnitude of said second current to equal the measured magnitude of said first current, and using the amount of adjustment required as a measure of the cross-talk.

3. In association with two transmission lines, means at each of two distant stations thereon for producing two alternating currents varying in frequency continuously and simultaneously and having a constant frequency difference, means for applying the currents produced at the first station to the interfering line for transmission thereover, detecting means at the second station in the line interfered with for deriving from the received portion of the transmitted currents a first current of the difference frequency, means at the second station for impressing the locally produced currents on said detecting means to derive a second current of the difference frequency, and means for comparing the magnitudes of the two currents of the difference frequency to determine the amount of cross-talk between the transmission lines.

4. In association with two transmission lines, means at each of two distant stations thereon for producing two alternating currents varying in frequency continuously and simultaneously and having a constant frequency difference, means for applying the currents produced at the first station to the interfering line for transmission thereover, a detector at the second station in the line interfered with for deriving from the received portion of the transmitted currents a first current of the difference frequency, means connected to the output of said detector for measuring said difference frequency current segregated from other currents, means at the second station for impressing the locally produced currents on said detector, whereby a second current of the difference frequency is impressed on said measuring means, and means for adjusting the magnitude of said second current of the difference frequency to equal the magnitude of said first current, the degree of adjustment required being a measure of the cross-talk between the two transmission lines.

5. The combination for the purpose of transmission measurement of means for generating two alternating currents which vary in frequency continuously and simultaneously but have a constant frequency difference, and means for deriving from said currents a current alternating at the difference frequency.

6. The method of producing energy for transmission measurement and the like, which consists in generating a first alternating current which varies continuously in frequency and generating at the same time a second alternating current which varies in frequency continuously and simultaneously with the first alternating current but with a constant difference of frequency between the two currents.

7. The method of producing energy for the measurement of cross-talk and the like, which consists in generating a first alternating current which varies continuously in frequency over a given range of frequencies and generating at the same time a second alternating current which varies in frequency continuously and simultaneously with the first alternating current but with a constant difference of frequency between the two currents.

8. In combination, means for generating a first alternating current which varies continuously in frequency and means for generating at the same time a second alternating current which varies in frequency continuously and simultaneously with the first alternating current but with a constant difference of frequency therefrom.

9. In combination, means for generating a first alternating current which varies continuously in frequency over a given range of frequencies and means for generating at the same time a second alternating current which varies in frequency continuously and simultaneously with the first alternating current but with a constant difference of frequency therefrom.

10. The method of measuring the interference between two transmission lines which consists in producing a first alternating current of continuously varying frequency and a second alternating current varying in frequency simultaneously with the first current but having a constant frequency difference therefrom, applying said first and second currents to the interfering line, deriving from that portion of the two currents received at one end of the line interfered with a current of the difference frequency, and determining the attenuation of the interfering path from the magnitude of this current segregated from other currents.

11. In association with two transmission lines, means for producing two alternating currents varying in frequency continuously and simultaneously and having a constant frequency difference, means for applying the currents produced by said current producing means to the interfering line, detecting means at one end of the line interfered with for deriving from the incoming portion of the currents from said current-producing means a first current of the difference frequency, means including said detecting means for producing a second current of the difference frequency unaffected by interference, and means for comparing the magnitudes of the two currents of the difference frequency to determine the amount of cross-talk between the transmission lines.

In testimony whereof, I have signed my name to this specification this 27th day of August, 1930.

JOSEPH HERMAN.